BEST AVAILABLE COPY

M. T. Lincoln.

Lock.

No. 3,519 Reissued Jun. 22, 1869.

Witnesses.
V. C. Clayton
A. M. Connell
Chas. H. Andrews

Inventor.
M. T. Lincoln,
by Atty.
J. C. Clayton

N. PETERS, PHOTO-LITHOGRAPHER, WASHINGTON, D. C.

BEST AVAILABLE COPY

M. T. Lincoln.

Lock.

No. 3,514. Reissued Jun. 22, 1869.

Witnesses
V. C. Clayton
A. McEntee
Chas. H. Anderson

Inventor
M. T. Lincoln
by atty.
J. E. Clayton

N. PETERS, PHOTO-LITHOGRAPHER, WASHINGTON, D. C.

United States Patent Office.

RUSSELL AND ERWIN MANUFACTURING COMPANY, OF NEW BRITAIN, CONNECTICUT, ASSIGNEES, BY MESNE ASSIGNMENTS, OF MARSHALL T. LINCOLN.

*Letters Patent No.* 42,954, *dated May* 31, 1864; *reissue No.* 3,519, *dated June* 22, 1869.

IMPROVEMENT IN DOOR-LATCHES.

The Schedule referred to in these Letters Patent and making part of the same.

*To all whom it may concern:*

Be it known that MARSHALL T. LINCOLN, of Washington, in the county of Washington, and District of Columbia, was the inventor of a new and useful Improvement in Locks; and that the following is a full, clear, and exact description thereof, and of its mode or manner of operation, reference being had to the accompanying drawings, and to the letters of reference marked thereon, and making a part of this specification.

This invention relates to a construction of lock, that by the closing of the door, causes the latch-bolt not only to fasten the door when closed, but also at the same time acts automatically to lock such latch, by the operation of a lever or device which is moved by the latch, as that is actuated by the closing of the door, so that the latch or the mechanical device fastening the door cannot be moved or operated so as to allow the door to be opened without first, by a suitable contrivance, such as a key, or its equivalent, being released from the locking-bolt or device.

This lock is also so constructed that it can be attached to the jamb or casing, instead of to the door, as has heretofore generally been the case.

Figure 6:
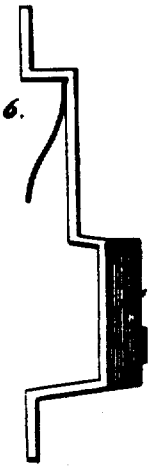
Figure 6 is a detached representation of the portion of the shell of the lock removed in fig. 4, and shown in dotted lines in fig. 5.

A is the lock-shell, usually of cast-metal, and then made in one piece, and provided with the necessary slots and bearings for the support and arrangement of the various parts of the lock, so as to require the least amount of boring and fitting; and A′ (shown at large in fig. 6) is the back plate.

Figure 2:
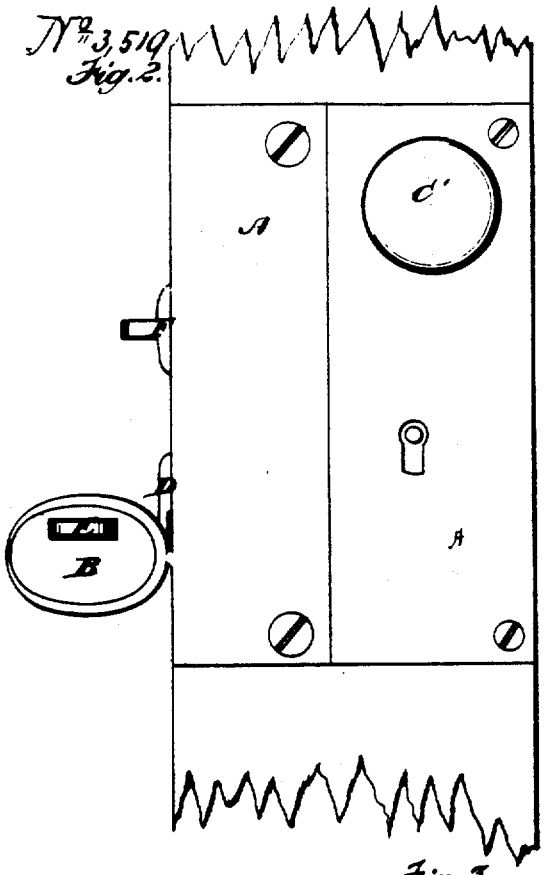
Figure 2 is a view of the face of the casing, with the lock attached thereto.
Figure 3:
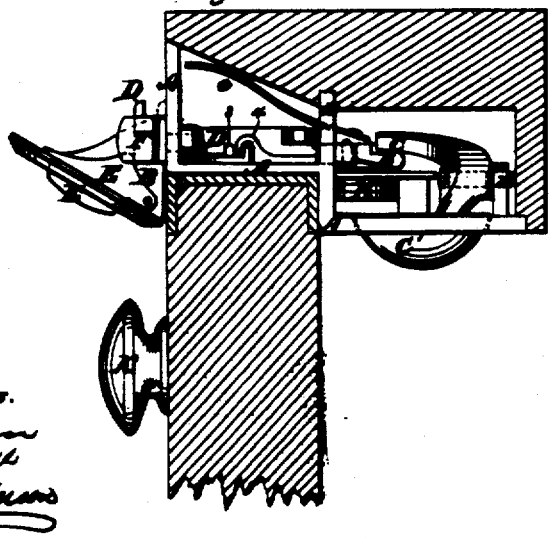
Figure 3 is a cross-section through the door-casing and door and lock-shell.

In figs. 2 and 3 is shown the manner in which the shell is let into and secured to the casing, *a* being a vertical partition, extending through the shell lengthwise and forming a part of it, and which serves both as a frame-work, and also renders it impossible to force off the lock from the outside, even when the outside screws are removed, such partition *a* being inserted into a suitable recess of the casing, as shown in fig. 3.

Figure 7:
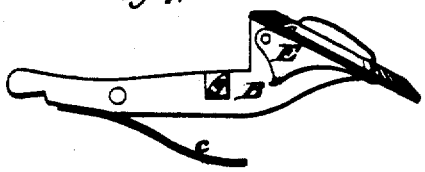
Figure 7 is a detached representation of the main latch-lever, or catch, which locks the door.
Figure 8:
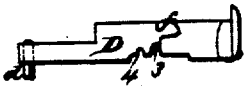
Figure 8 is a detached representation of the sliding or locking-bolt.

B is the main latch or latch-lever, having its fulcrum at the bearing 1, and the profile of which is shown in fig. 7.

In fig. 3 is seen the manner in which it secures the door when shut, its rectangular shoulder catching against the guard-plate *b* on the edge of the door.

Figure 4:
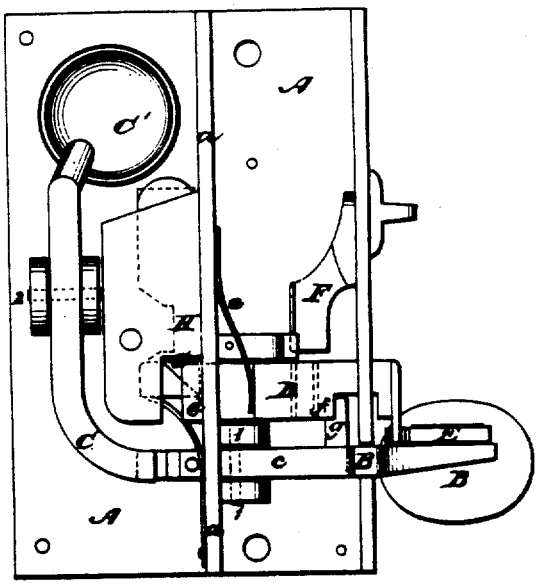
Figure 4 is a plan view of the lock, seen from the inside, a portion of the shell of the lock being removed.

C is the outside operating-lever, having its fulcrum at the bearing 2, and finished at its upper end with an ornamental knob, C′, which partially protrudes through the shell at a point outside of the door-line. The lower end of such lever has a rectangular bend, as shown in figs. 4 and 5, so that it may operate upon the inner end of the main latch-lever B, which is at right angles with the lever C.

Figure 5:
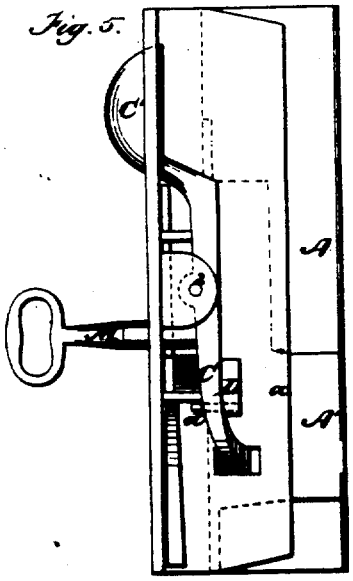
Figure 5 is an edge view of the lock, as seen from the outside, the casing being removed.

A spring, *c*, attached to the lever B, and acting against the inner shell A′, keeps such lever in a position to fasten and hold the door closed, and also, through its action upon such lever B, keeps the knob-handle of lever C protruded through its orifice in the shell, as shown in figs. 3 and 5.

Pressure upon the knob C′ and knob-lever C operates upon the latch-lever or catch B, so as to throw it back far enough to permit the door to pass by or escape it, when the door is swung open.

D is the regulating or locking slide-bolt, sliding in slots in the shell, the position of which is parallel to and a short distance from the lever-latch B, and the inner end of which is provided with a pin, *d*, which is operated on by the key-bolt G, so as to slide the bolt D inward.

Such bolt is forced outward, as shown in fig. 4, by a flat spring, *e*, and when in such position a lug, *f*, on such bolt passes over and rests upon a stud, *g*, on the lever B, so that it is impossible to force the lever-latch B back, so as to open the door without first sliding back the bolt D, so as to release such stud *g* from the control of the lug *f*.

Such bolt D may be slid back either by the action of the key-bolt G on the pin *d*, as before mentioned, or by direct action upon the outer end of such bolt D by the cam E, pivoted to the latch B, one face of which passes through the broad surface at the end of the latch B, the other end lying against the end of the bolt D, and is operated by the hand or thumb, pressure on which causes the bolt D to slide in, and thus release the stud *g* of the latch, so that the latch B can be pushed back to permit the opening of the door.

When it is desired to open the door from without, the bolt D is caused to slide in by the action of the key-bolt G on the pin *d* of the bolt D, and the knob C′ is pressed in, the lever connected with which acts against the end of the lever connected with the latch B, and causes such latch to be pushed back, so as to permit the door to be opened.

The lever C has no connection, either with the locking-bolt D or with the cam E.

Figure 1:
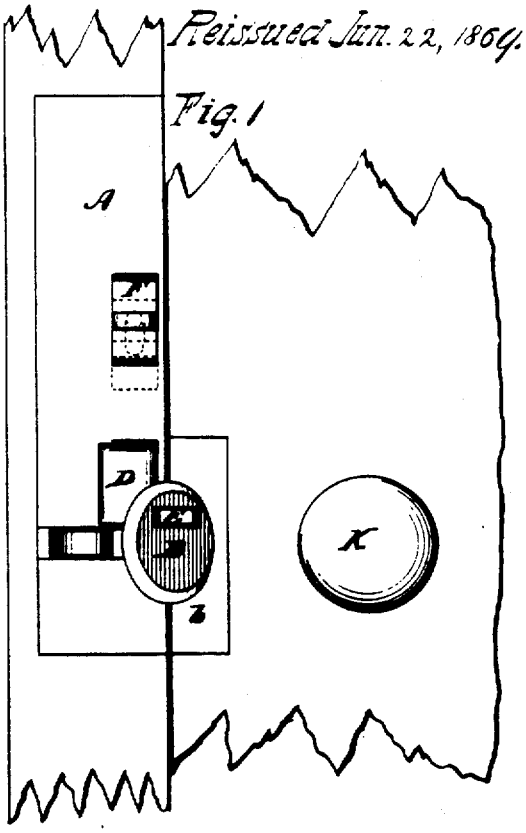
Figure 1 is a front view of a portion of the door-casing and door and lock, as seen from the inside.

When the door is shut forcibly, the guard-plate *b* on the door first strikes against the face of the cam E, projecting beyond the surface of the latch, and causes the bolt D to slide in, which allows the latch B to be pushed back by the further movement of the door, and the door to be fully closed, when the latch B takes the position shown in fig. 1, when the bolt D again slides out, and the latch is locked.

F is a sliding catch for fastening the bolt D in any position, and is, of course, operated solely from the inside of the room.

When it is desired to hold the bolt D in, the catch F (such bolt being pushed in) is forced down, and enters a slot, 3, in such bolt, and the bolt is held stationary in that position until released by the catch.

When the bolt is in this position, the lock becomes a simple latch to open the door from within, the knob K is taken hold of, and the latch B is pushed back by the thumb or finger, and the door opens To open the door from without, the protruding knob of the lever C is pushed in, which pushes back the latch B, and the door is opened.

When it is desired to hold the bolt D out, the catch F is forced down, when such bolt D is out, into the slot 4 in such bolt.

This makes the lock a "dead-lock," or burglar-proof lock.

When the bolt D is held in this position, it is impossible to pick the lock from the outside, with or without the key, for any picking-instrument, after entrance through the key-hole, would have to bore through the partition of the lock-shell in order to get to the catch, and then it would be impracticable to move the catch vertically, so as to release the bolt.

When the lock is to be used as a night-latch, the catch F is raised and wholly disengaged from the bolt D, which then slides out, as shown in fig. 4.

In order to then open the door from the inside, it is necessary that pressure should first come upon the cam E, which forces in the bolt D, and thus permits the latch B to be pushed back, which allows the door to open.

To open the door from without, it is necessary to use the key, which, acting upon the tumblers H, forces down the key-bolt G against the pin *d*, thus sliding in the bolt D, and at the same time the knob-lever C is pushed in, which withdraws the latch B and allows the door to be opened.

The lock is thus capable of acting in three different modes, and as three distinct mechanisms, although forming but one machine, that is, as a simple latch, or as a night-latch, or as a burglar-proof lock.

What is claimed as new, and is desired to be protected by Letters Patent, is—

1. The combination of the latch B and sliding or locking-bolt D, constructed and arranged so that both are acted upon or operated by the closing of the door, and that the latter will, as the former moves back to fasten the door, lock or secure the latch, for the purposes set forth.

2. In combination with such latch B and locking-bolt D, the arrangement of the cam E, for moving or sliding back the bolt D, for the purposes set forth.

3. The combination and arrangement of the latch B, knob C', lever C, and sliding-bolt D, operating substantially as and for the purposes set forth.

4. In combination with the latch B, and sliding or locking-bolt D, the arrangement of the key-bolt G, or its equivalent, for moving back such bolt, for the purposes specified.

5. The combination and arrangement of the tumblers H, key-bolt G, latch B, and sliding bolt D, for the purposes specified.

6. The combination of the latch B, and cam E pivoted to said latch, substantially as and for the purposes specified.

RUSSELL & ERWIN MF'G CO,
By M. J. WOODRUFF, *Attorney.*

Witnesses: FRED. B. SEARS,
H. HOLDREGE.